United States Patent [19]

Morimoto

[11] Patent Number: 5,318,244
[45] Date of Patent: Jun. 7, 1994

[54] CLUTCH CONTROL MECHANISM FOR A BAITCASTING REEL

[75] Inventor: Shinichi Morimoto, Nishinomiya, Japan

[73] Assignee: Shimano, Inc., Osaka, Japan

[21] Appl. No.: 883,385

[22] Filed: May 15, 1992

[30] Foreign Application Priority Data

May 23, 1991 [JP] Japan .............................. 3-036673[U]
May 31, 1991 [JP] Japan .............................. 3-040085[U]

[51] Int. Cl.⁵ .......................................... A01K 89/015
[52] U.S. Cl. ................................................. 242/261
[58] Field of Search ........................ 242/259, 260, 261

[56] References Cited

U.S. PATENT DOCUMENTS 4,919,360 4/1990 Roberts ..................... 242/261 X
5,058,823 10/1991 Emura et al. ..................... 242/261

FOREIGN PATENT DOCUMENTS 2-29270 2/1990 Japan .

Primary Examiner—Daniel P. Stodola
Assistant Examiner—Michael R. Mansen
Attorney, Agent, or Firm—Dickstein, Shapiro & Morin

[57] ABSTRACT

A baitcasting reel includes a spool and a clutch controller disposed between right and left side bodies. The clutch controller acts also as a thumb rest disposed immediately rearwardly of the spool. The clutch controller is manually operable between a first control position to engage a clutch mechanism, and a second control position to disengage the clutch mechanism. A link mechanism connects the clutch controller to the side bodies such that a thumb rest surface of the clutch controller is maintained in a horizontal or forwardly inclined posture while the clutch controller is switched from the first control position to the second control position.

7 Claims, 10 Drawing Sheets

CLUTCH CONTROL MECHANISM FOR A BAITCASTING REEL

BACKGROUND OF THE INVENTION

1. Field of the Invention

This invention relates to a clutch control mechanism for a baitcasting reel, and more particularly to a clutch control mechanism for a baitcasting reel having a clutch controller mounted between right and left side bodies and immediately rearwardly of a spool to be manually operable between a first control position to engage a clutch mechanism mounted in a spool drive line, and a second control position to disengage the clutch mechanism.

2. Description of the Related Art

Conventionally, the clutch controller is attached to the side bodies through oscillatable arms to be movable substantially arcuately between the first control position to engage the clutch mechanism and the second control position to disengage the clutch mechanism.

Consequently, with the movement between the first and second control positions, a thumb rest surface formed on the clutch controller has an angular posture thereof variable to hamper a control operation. The angular variations of the thumb rest surface are inconvenient particularly since the clutch controller is disposed between the right and left side bodies to act also as a thumb rest during fishing.

A construction to eliminate this drawback is disclosed in Japanese Utility Model Publication Kokai No. 1990-29270, for example, wherein the clutch controller is movable along peripheral surfaces of the side bodies. With this construction, however, the clutch controller cannot be connected directly to the oscillatable arms extending from the side bodies. The clutch controller is guided in its movement from the first control position to the second control position by a guide mechanism formed on the peripheral surface of one side body, to minimize the angular variations of the thumb rest surface.

However, the guide mechanism cannot be formed with a high degree of precision without involving high manufacturing cost. In addition, such a guide mechanism is an extra component not essential to the clutch controller. The guide mechanism is therefore formed relatively coarsely. The coarse guide mechanism causes clattering of the clutch controller to inconvenience its use.

SUMMARY OF THE INVENTION

The object of the present invention is to provide a clutch controller having excellent operability with an improved connecting mechanism through which the clutch controller is connected to side bodies.

The above object is fulfilled, according to the present invention, by a clutch control mechanism in which a clutch controller is attached to side bodies through a link mechanism such that a thumb rest surface of the clutch controller is maintained in a horizontal or forwardly inclined posture while the clutch controller is switched from a first control position to a second control position.

This construction has the following function and effect.

Since the thumb rest surface of the clutch controller is maintained in a horizontal or forwardly inclined posture while the clutch controller is switched from the first control position to the second control position, the angler may just move his or her thumb linearly to switch the clutch mechanism. The angler need not make an effort to prevent the thumb from slipping off the thumb rest surface as when the clutch controller moves arcuately. The link mechanism employed to attach the clutch controller to the side bodies allows the clutch controller to move without clattering while maintaining the thumb rest surface in the above posture. Also when setting the clutch controller to the first control position or second control position, the angler may place the thumb on the thumb rest surface stably without taking care not to have the thumb slip off rearwardly.

Thus, when switching the clutch controller from the first control position to the second control position, the angler need not take special care in using the thumb in a way to follow movement of the clutch controller as in the prior art. Further, the invention provides the advantages of reducing the clutch operating load, and allowing the clutch controller to be operated free of clattering and smoothly with natural movement of the thumb.

Since the clutch controller may be set to a desired position with ease, the angler may readily carry out thumbing with the thumb contacting both the clutch controller and spool. Thus, the clutch controller of the present invention realizes an efficient clutch operation.

Other features and advantages of the present invention will be apparent from the following description of the preferred embodiments taken with reference to the accompanying drawings.

DETAILED DESCRIPTION OF THE PREFERRED EMBODIMENTS

Baitcasting reels according to the present invention will be described in detail with reference to the drawings.

Figure 1:
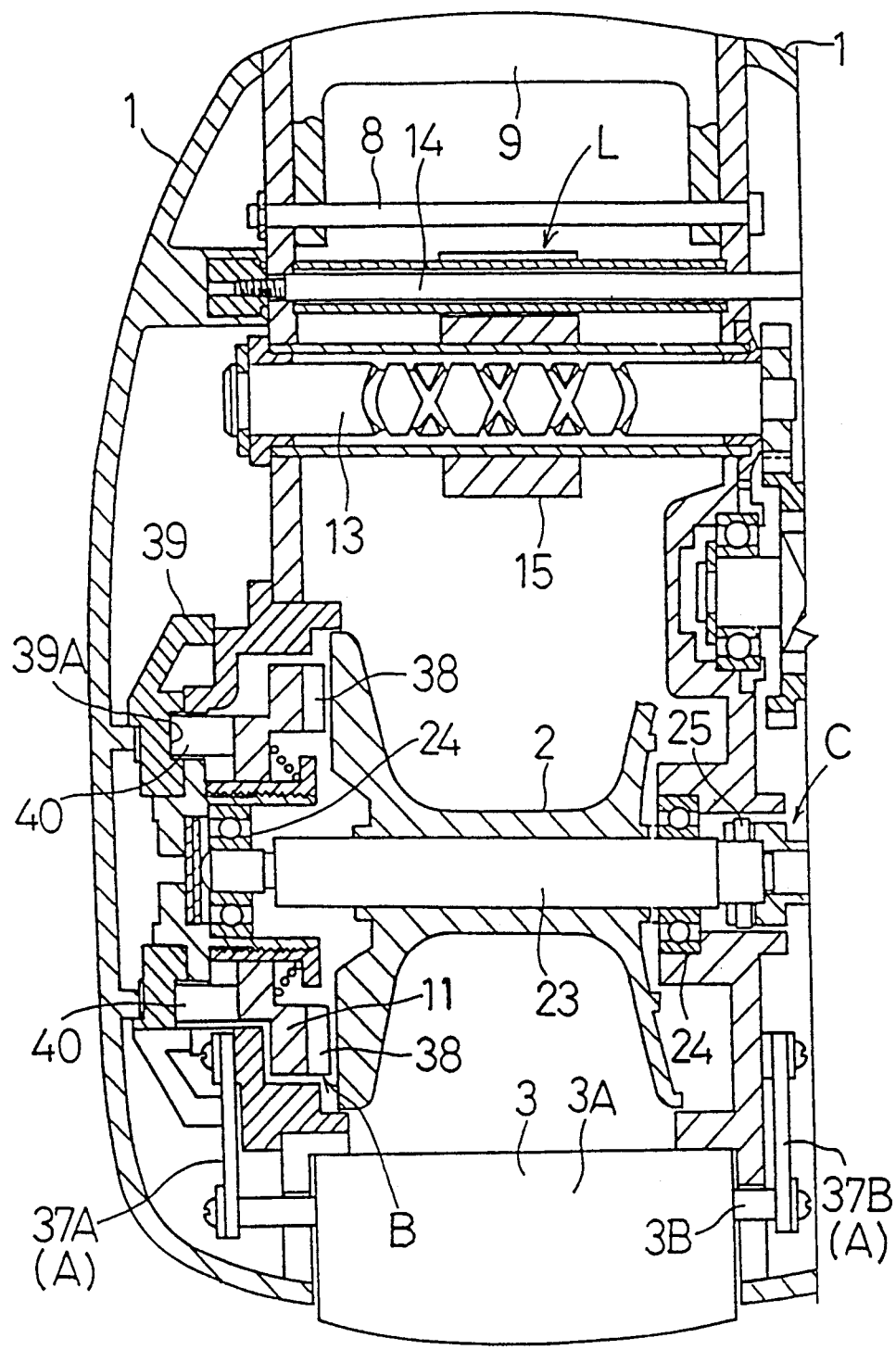
FIG. 1 is a plan view in cross section of a left side body of a baitcasting reel.
Figure 2:
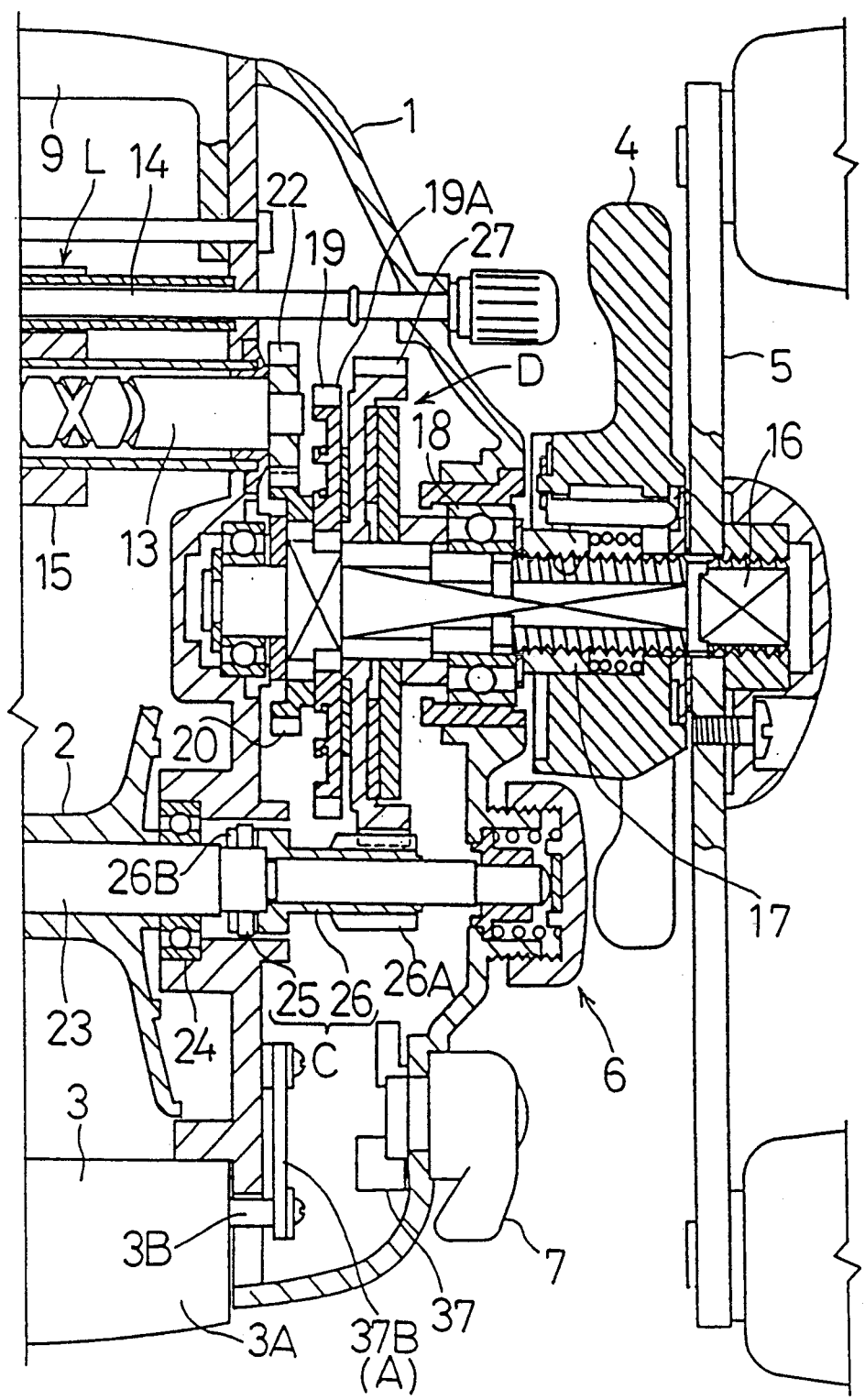
FIG. 2 is a plan view in cross section of a right side body of the baitcasting reel.

FIGS. 1 and 2 show a baitcasting reel in one embodiment of the invention. The reel comprises right and left side bodies 1 constituting a main body frame, and a level wind mechanism L mounted in a front position between the two side bodies 1. Further, the main body frame has a spool 2 mounted centrally thereof and a clutch controller 3 mounted in a rear position. The right side body 1 supports a drag controller 4, a handle 5, a cast controller 6 and a control mode lever 7. The reel also includes a cover 9 pivotable around a support shaft 8 for opening and closing the reel interior.

The level wind mechanism L includes a screw shaft 13, and a line guide 15 reciprocable right and left along a guide rod 14 with rotation of the screw shaft 13.

As shown in FIG. 2, the right side body 1 rotatably supports a handle shaft 16 connected to the handle 5. The drag controller 4 is mounted on a nut 17 meshed with a screw portion of the handle shaft 16. When the drag controller 4 is turned, a pressing force corresponding to an amount of this turning operation is transmitted from the nut 17 to a drag mechanism D through a bearing 18.

Figure 3:
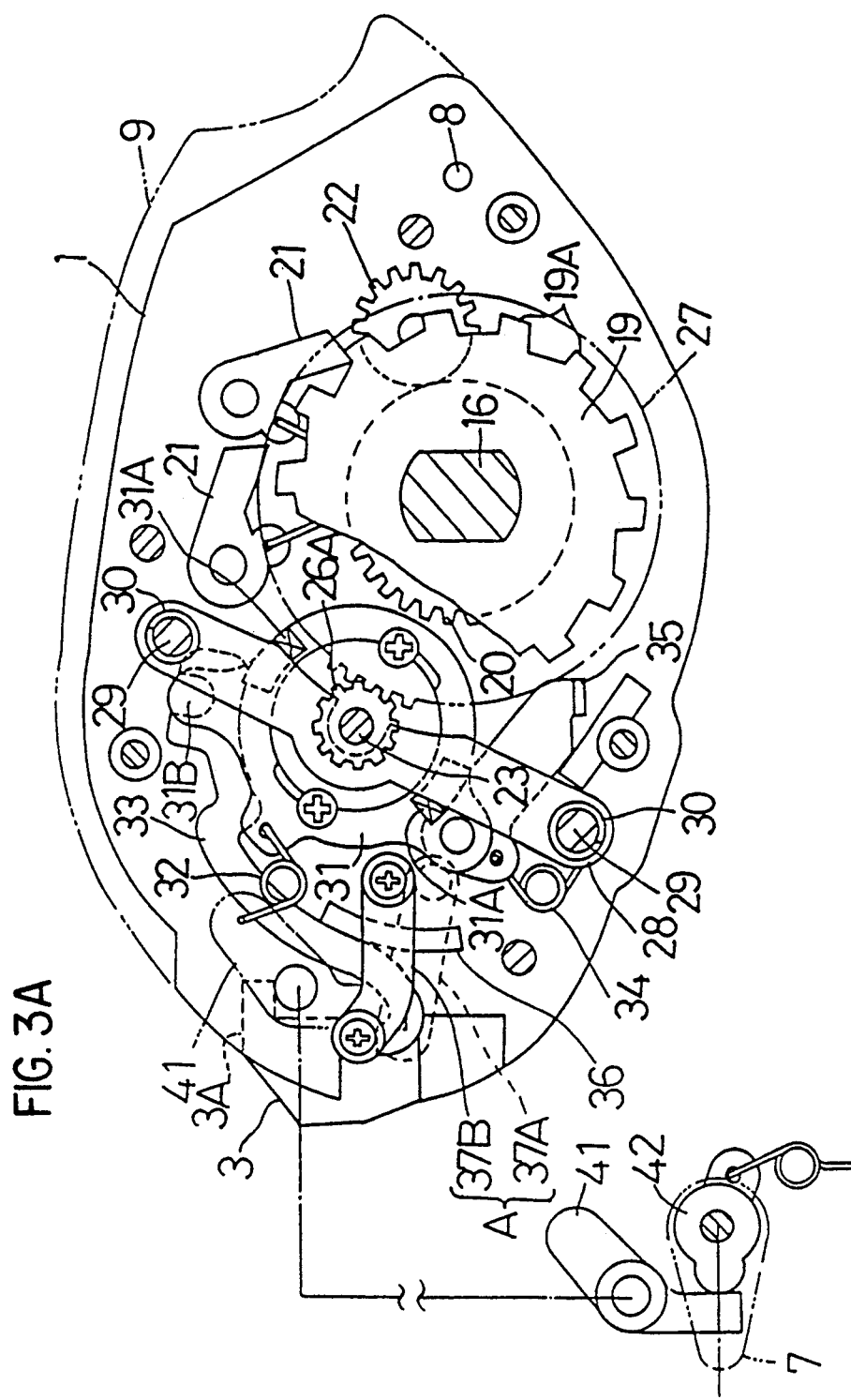
FIGS. 3A and 3B are side views in vertical section of the right side body.
Figure 4:
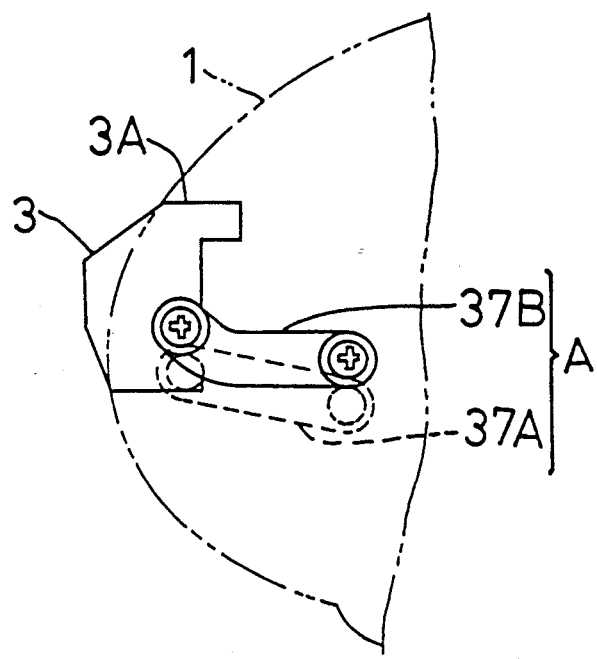
FIG. 4 is a schematic side view of a clutch controller in a first control position.
Figure 5:
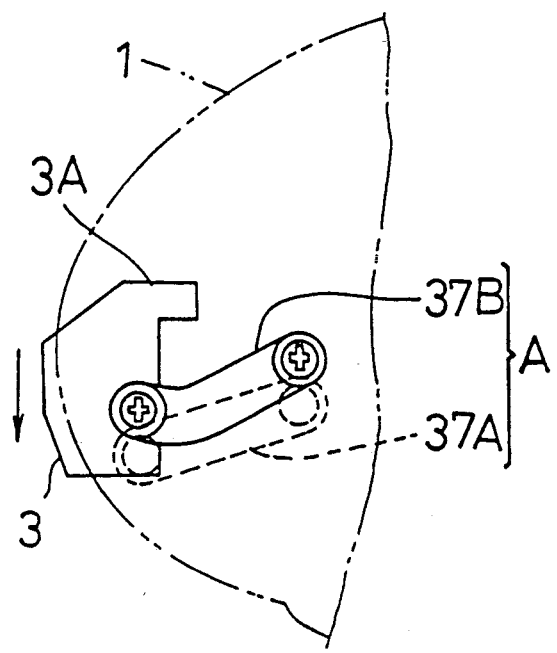
FIG. 5 is a schematic side view of the clutch controller in a second control position.
Figure 6:
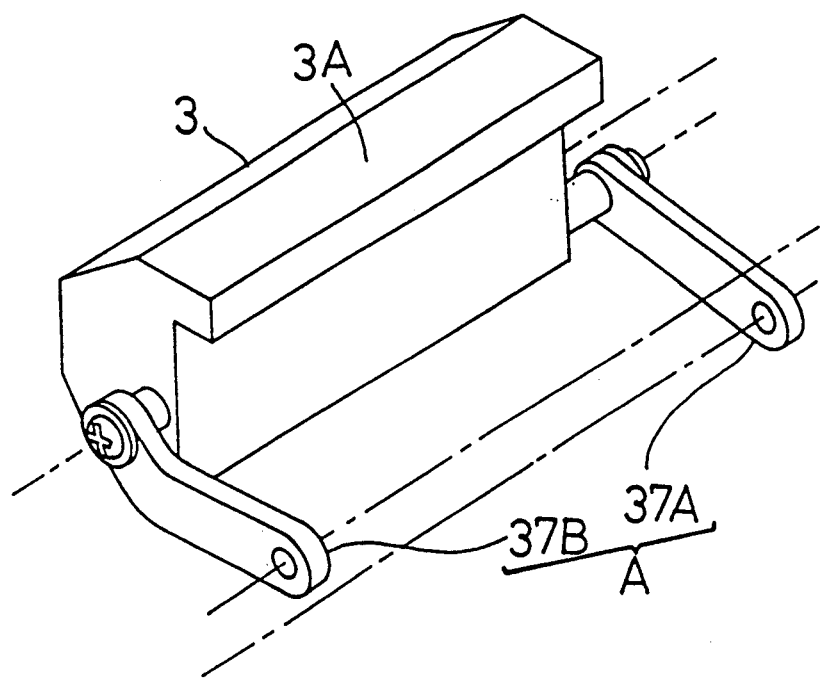
FIG. 6 is a perspective view of the clutch controller and a link mechanism.

The handle shaft 16 supports the drag mechanism D, a ratchet wheel 19 and a transmission gear 20. As shown in FIG. 3, a pair of ratchet pawls 21 are engageable in different phases of rotation with teeth 19A of the ratchet wheel to prevent backward turning of the handle 5. The transmission gear 20 is meshed with an input gear 22 mounted on the screw shaft 13 for driving the level wind mechanism L.

The spool 2 has a spool shaft 23 rotatable therewith. The spool shaft 23 is supported by bearings 24. The spool shaft 23 has an engaging pin 25 attached to an intermediate position thereof. Further, the spool shaft 23 supports a clutch sleeve 26 slidably mounted thereon to be engageable with the pin 25.

The clutch sleeve 26 has an input gear 26A meshed with an output gear 27 of the drag mechanism D. When the handle 5 is turned with an engaging portion 26B of the clutch sleeve 26 engaged with the pin 25, the spool 2 is rotated to wind a fishing line (not shown) thereon.

The clutch sleeve 26 and pin 25 constitute a clutch mechanism C. This clutch mechanism C is disengaged for a bait casting action.

As shown in FIGS. 2, 3A and 3B, the clutch sleeve 26 is engaged with a shifter 28 supported on a pair of support shafts 29 extending parallel to the spool shaft 23. Coil springs 30 are mounted on the support shafts 29 to urge the shifter 26 to a clutch engaging position. An annular cam 31 is rotatably mounted coaxially with the spool shaft 23 to operate the shifter 28 to a declutching position. This annular cam 31 defines a pair of cam surfaces 31A projecting therefrom.

A first toggle spring 32 acts on the annular cam 31 to set the annular cam 31 to a first control position to engage the clutch mechanism C and to a second control position to disengage the clutch mechanism C. The annular cam 31 includes an arm 31B extending therefrom and pinned to a semicircular element 33 interlocked to the clutch controller 3. Further, the annular cam 31 pivotally supports a return arm 35 on which a second toggle spring 34 acts. A contact arm 42 is rigidly connected to the control mode lever 7 for contacting a pivot arm 41 supporting the first toggle spring 32, to switch position of a dead point of the first toggle spring 32.

The control mode lever 7 is operable to select between a toggle mode and a momentary mode. (The selecting operation will not particularly be described.) In the toggle mode, the clutch mechanism C remains engaged when the clutch controller 3 is released after being pressed with a thumb. In the momentary mode, the clutch controller 3 returns to the original position to re-engage the clutch mechanism C when the clutch controller 3 is released.

When the clutch mechanism C is disengaged in the toggle mode, the return arm 35 is switched to a position in which a free end thereof can interfere with the teeth 19A of ratchet wheel 19. Thus, when the handle 5 is turned in the line winding direction, its operating force transmitted through the ratchet wheel 19 and return arm 35 rotates the annular cam 31 beyond the dead point. As a result, the clutch mechanism C is engaged by the forces of the first toggle spring 32 and the coil springs 30 mounted on the support shafts 29.

A pair of oscillatable arms 37A and 37B having the same length extend from side walls of the side bodies 1 adjacent the spool 2 toward opposite side walls of the clutch controller 3, respectively. Distal ends of the oscillatable arms 37A and 37B are connected to the side walls of the clutch controller 3 through pins 3B. The oscillatable arms 37A and 37B have a four-point link mechanism with the distal ends thereof attached in different vertical levels to the clutch controller 3. Thus, the clutch controller 3 is movable substantially vertically between a first control position to engage the clutch mechanism C, and a second control position to disengage the clutch mechanism C. The clutch controller 3 defines a thumb rest surface 3A which remains horizontal throughout the vertical movement of the clutch controller 3. The oscillatable arms 37A and 37B are called herein a link mechanism A for connecting the clutch controller 3 to the side bodies 1.

The semicircular element 33 has a lower end thereof in contact with a lower position of the oscillatable arm 37B. When clutch controller 3 is depressed, the semicircular element 33 slides along a guide 36. As a result, the annular cam 31 is rotated to disengage the clutch mechanism C.

As shown in FIG. 1, the left side body 1 contains a brake mechanism B including magnets 38 for generating eddy currents on the spool 2 formed of a metal, to apply a braking force to the spool 2 in rotation. The brake mechanism B further includes a control disk 39 which is partly exposed when the cover 9 is opened, pins 40 extendible and retractable by a cam groove 39A formed in the control disk 39, and a plate 11 movable with the pins 40 and supporting the magnets 38. The closer the magnets 38 are to the spool 2, the stronger is the braking force.

Figure 7:
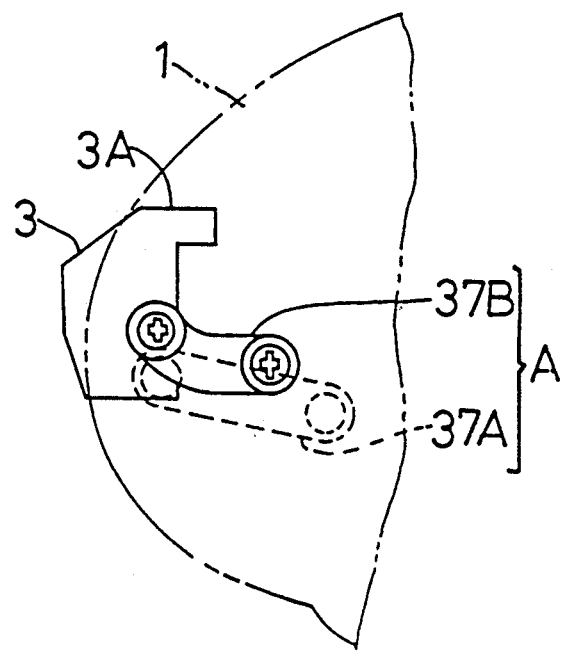
FIG. 7 is a side view of a modified link mechanism for supporting the clutch controller.

FIG. 7 shows a modified link mechanism A in which an upper oscillatable arm 37B is shorter than a lower oscillatable arm 37A. With this construction, the thumb rest surface 3A of the clutch controller 3 becomes forwardly inclined as the clutch controller 3 moves downward, thereby preventing the thumb from slipping off rearwardly.

The link mechanism A may include a four-point linkage with two, upper and lower, oscillatable arms 37 provided on each side of the clutch controller 3.

A different embodiment will be described next.

This embodiment includes a clutch controller mounted on a support shaft to be rotatable about an axis of the support shaft, the support shaft being oscillatable with the clutch controller about an axis of a connecting shaft connected to side bodies. The clutch controller has a rotation limiting mechanism for limiting rotation of the clutch controller relative to the support shaft to a fixed range, and a biasing mechanism for maintaining the clutch controller in a predetermined angular posture.

The above construction advantageously has the following function and effect.

When the angler places his or her thumb on a thumb rest surface of the clutch controller and depresses the clutch controller, the clutch controller rotates relative to the support shaft from the predetermined angular posture while oscillating about the axis of the connecting shaft. This results in a posture of the thumb rest surface following the thumb of the angular.

Compared with a linearly movable clutch controller, the simple structure for allowing oscillation of the clutch controller is effective to check clattering of the clutch controller itself. When switching the clutch controller, the angler need not use the thumb in a way to follow the posture of the thumb rest surface of the clutch controller as in the prior art. This construction has the advantages of reducing the clutch operating load, and allowing the clutch operation to be carried out smoothly with a natural movement of the thumb.

In addition, the clutch controller returns to the predetermined posture whenever the thumb is removed therefrom. This feature eliminates the necessity for confirmation when operating the clutch.

This embodiment will be described in greater detail hereinafter.

Figure 10:
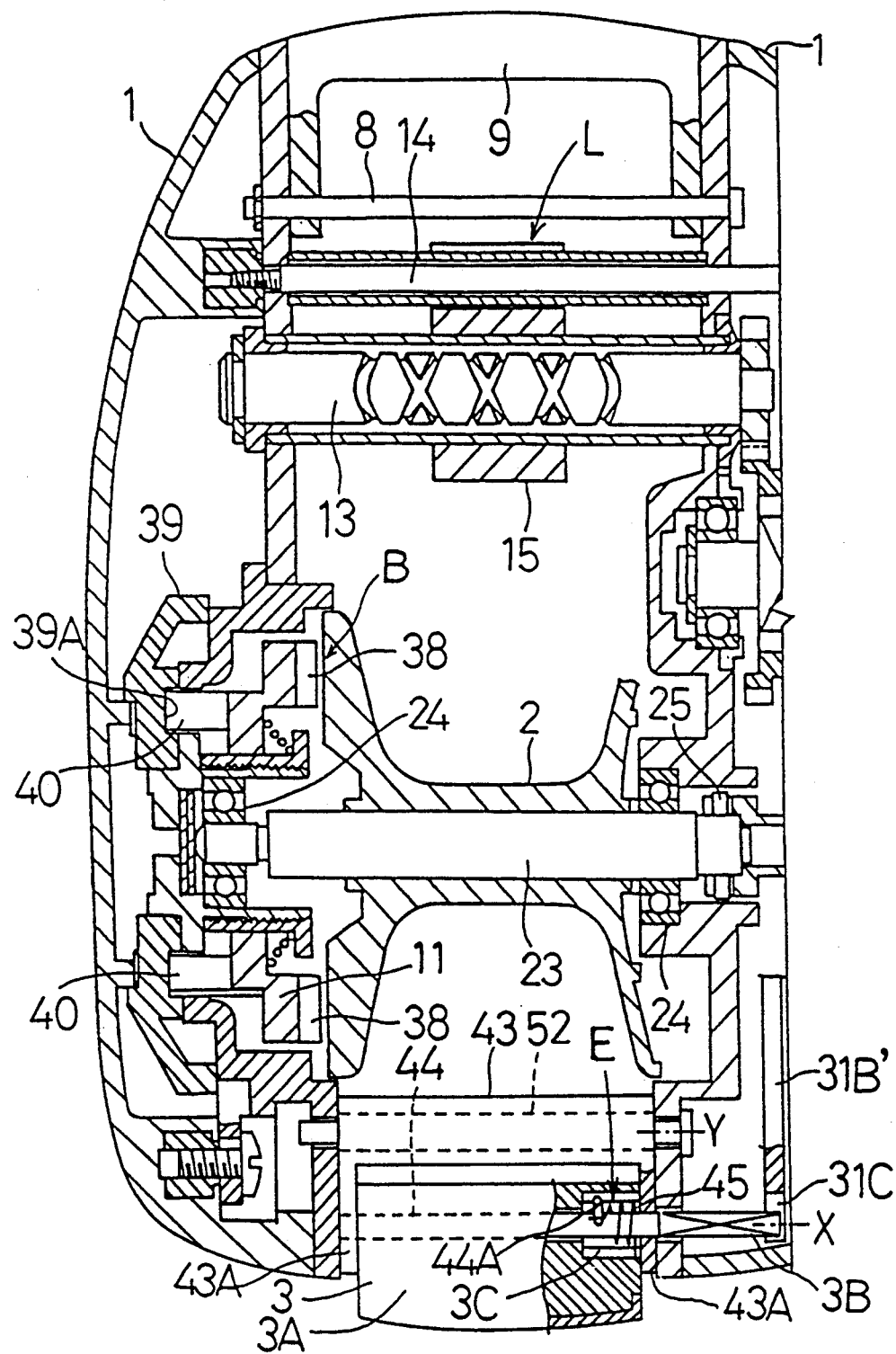
FIG. 10 is a plan view in cross section of a left side body of a baitcasting reel in the different embodiment.
Figure 11:
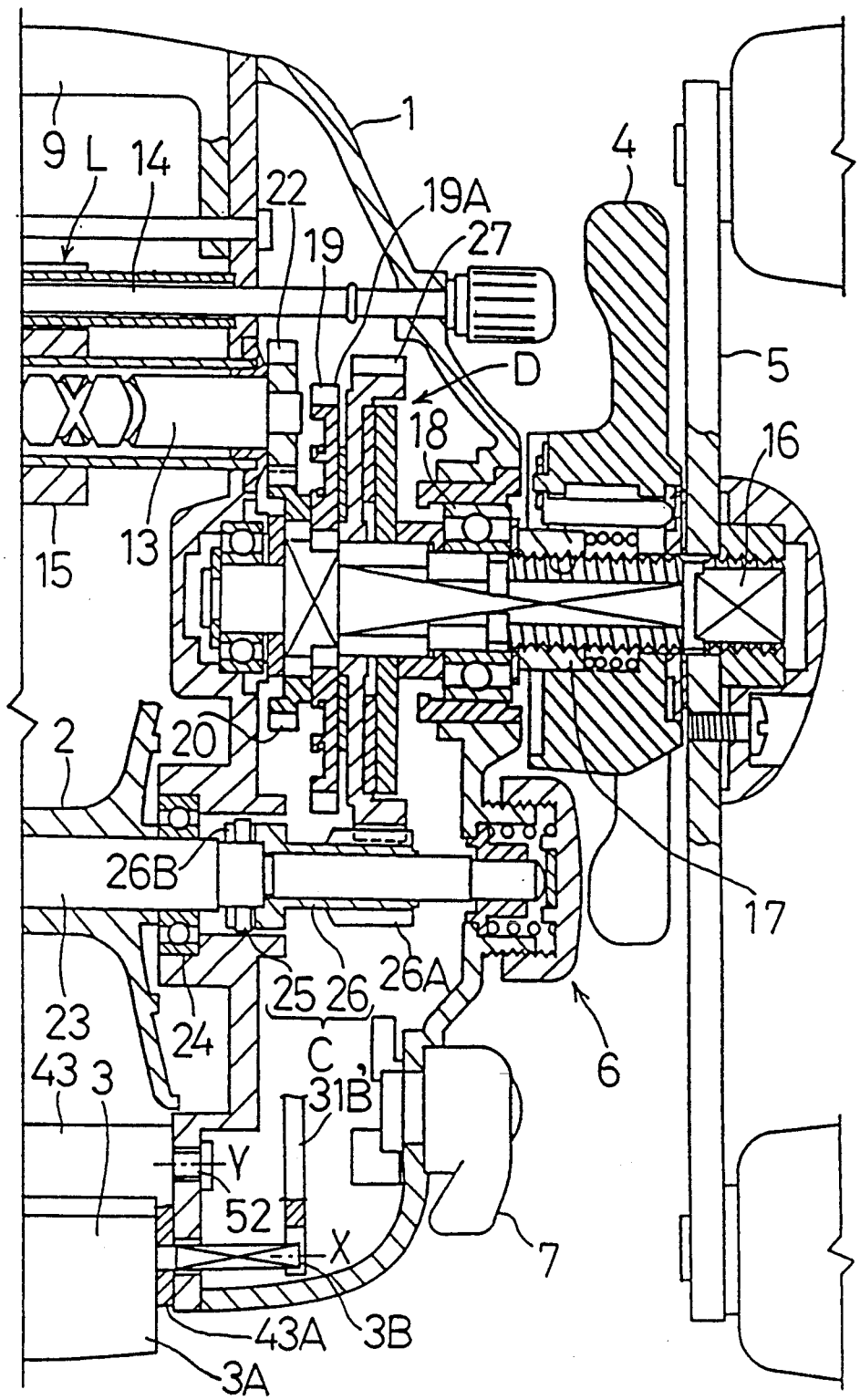
FIG. 11 is a plan view in cross section of a right side body of the baitcasting reel in the different embodiment, FIGS. 12A and 12B side views in vertical section of the right side body.

FIGS. 10 and 11 show a baitcasting reel according to this embodiment. The reel comprises right and left side bodies 1 constituting a main body frame. A level wind mechanism L, a line winding spool 2 and a clutch controller 3 are mounted between the two side bodies 1. The right side body 1 supports a drag controller 4, a handle 5, a cast controller 6 and a control mode lever 7. The left side body 1 contains a magnet type brake mechanism B. The reel also includes a cover 9 pivotable around a support shaft 8 for opening and closing the reel interior, and a mounting foot 10.

Figure 13:
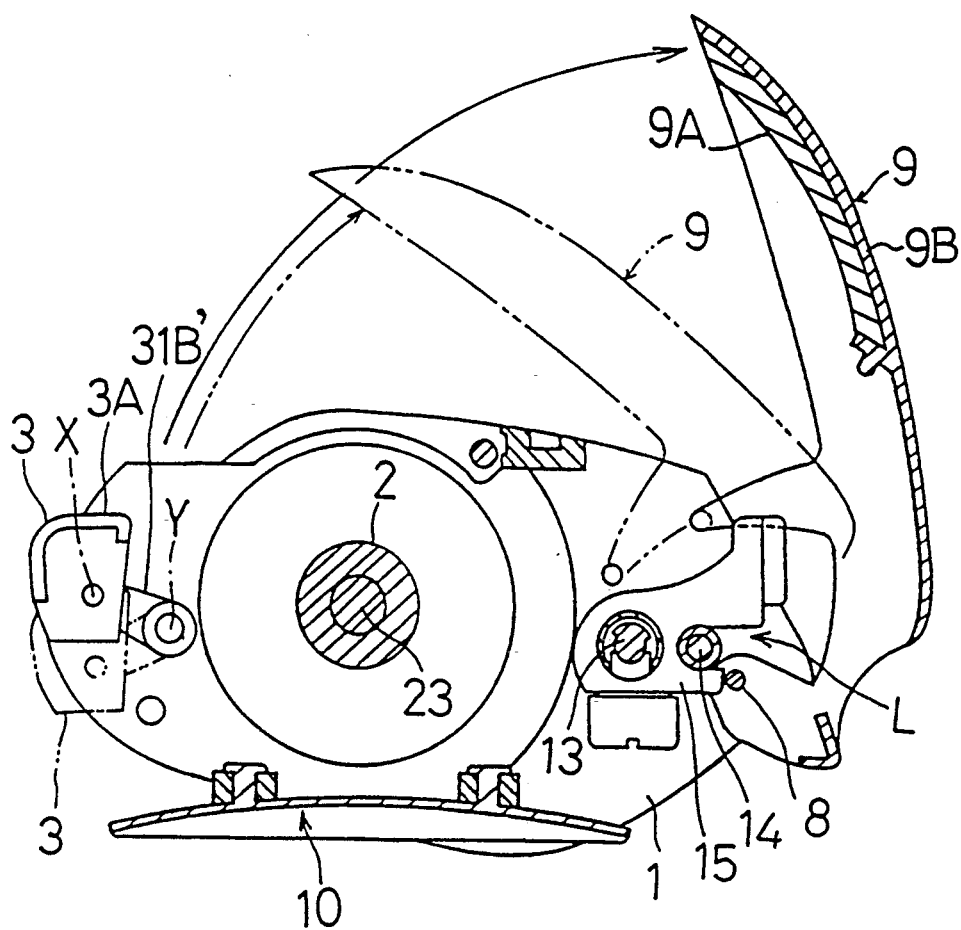
FIG. 13 is a side view in vertical section showing a cover of the reel.

As shown in FIG. 13, the cover 9 includes a resin body 9A coated with a pressed aluminum sheet 9B. The resin body 9A is formed integrally with an inner surface of the pressed sheet 9B, which facilitates buffing and cutting of the pressed sheet 9B during manufacture. Thus, while the pressed sheet 9B presents a metallic color surface, the integral formation with the resin provides an advantage of low cost.

As shown in FIG. 11, the right side body 1 rotatably supports a handle shaft 16 connected to the handle 5. The drag controller 4 is mounted on a nut 17 meshed with a screw portion of the handle shaft 16. When the drag controller 4 is turned, a pressing force corresponding to an amount of this turning operation is transmitted from the nut 17 to a drag mechanism D through a bearing 18.

Figure 12:
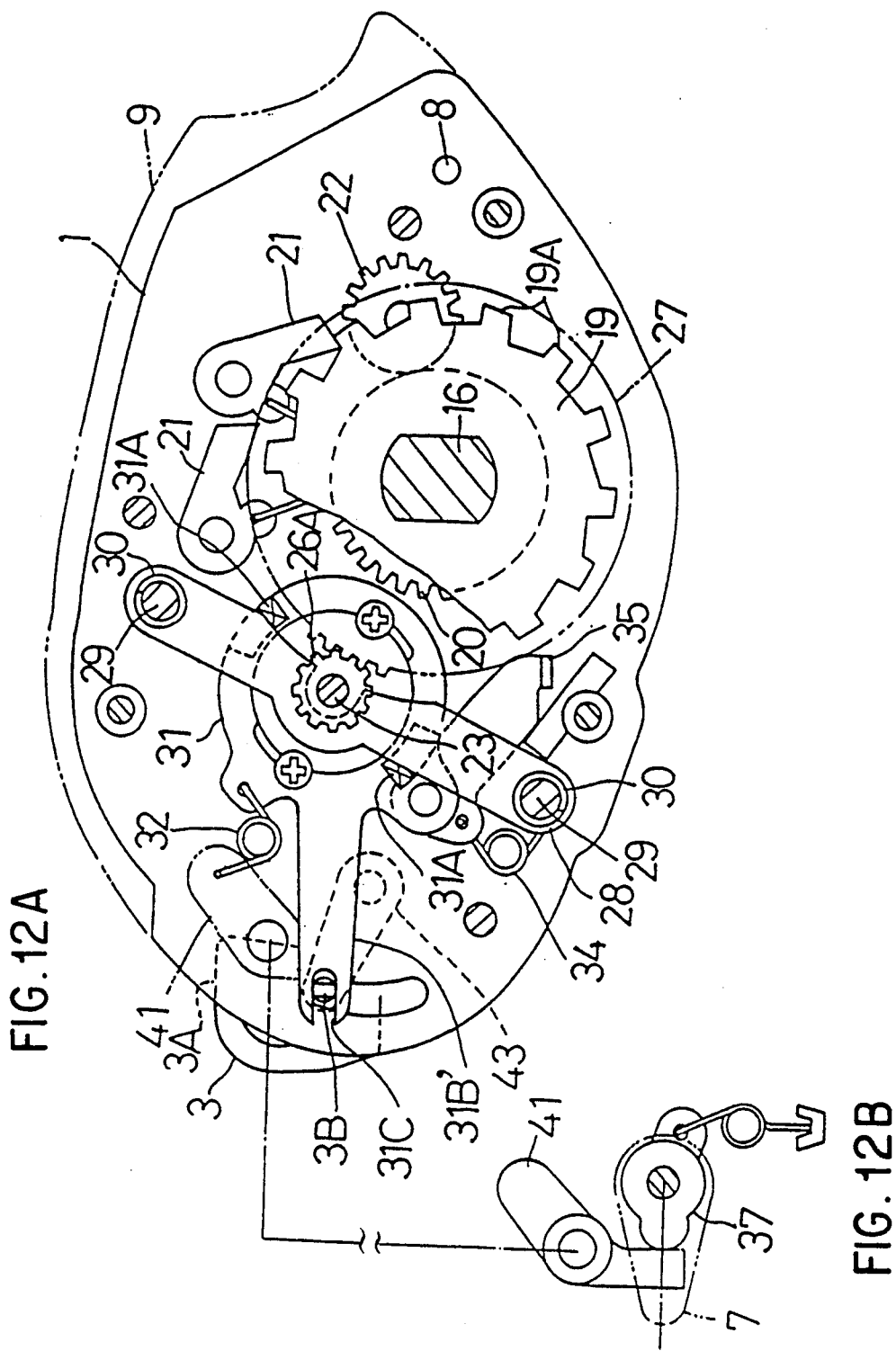

As shown in FIGS. 11, 12A and 12B, the handle shaft 16 supports the drag mechanism D, a ratchet wheel 19 and a transmission gear 20. A pair of ratchet pawls 21 are engageable in different phases of rotation with teeth 19A of the ratchet wheel to prevent backward turning of the handle 5. The transmission gear 20 is meshed with an input gear 22 mounted on a screw shaft 13 for driving the level wind mechanism L.

The spool 2 has a spool shaft 23 rotatable therewith. The spool shaft 23 is supported by bearings 24. The spool shaft 23 has an engaging pin 25 attached to an intermediate position thereof. Further, the spool shaft 23 supports a clutch sleeve 26 slidably mounted thereon to be engageable with the pin 25.

The clutch sleeve 26 has an input gear 26A meshed with an output gear 27 of the drag mechanism D. When the handle 5 is turned with an engaging portion 26B of the clutch sleeve 26 engaged with the pin 25, the spool 2 is rotated to wind a fishing line (not shown) thereon.

As shown in FIGS. 12A and 12B, the clutch sleeve 26 is engaged with a shifter 28 supported on a pair of support shafts 29 extending parallel to the spool shaft 23. Coil springs 30 are mounted on the support shafts 29 to urge the shifter 26 to a clutch engaging position. An annular cam 31 is rotatably mounted coaxially with the spool shaft 23 to operate the shifter 28 to a declutching position. This annular cam 31 defines a pair of cam surfaces 31A projecting therefrom.

A first toggle spring 32 acts on the annular cam 31 to set the annular cam 31 to a first control position to engage the clutch mechanism C and to a second control position to disengage the clutch mechanism C. The annular cam 31 includes an arm 31B' extending therefrom and defining a cutout 31C. The clutch controller 3 has an interlocking pin 3B extending into the cutout 31C, thereby interconnecting the clutch controller 3 and annular cam 31. Further, the annular cam 31 pivotally supports a return arm 35 on which a second toggle spring 34 acts. A contact arm 37 is rigidly connected to the control mode lever 7 for contacting a pivot arm 41 supporting the first toggle spring 32, to switch position of a dead point of the first toggle spring 32. The arm 31B' of the annular cam 31 acts as a drive arm for driving the clutch mechanism C.

Figure 8:
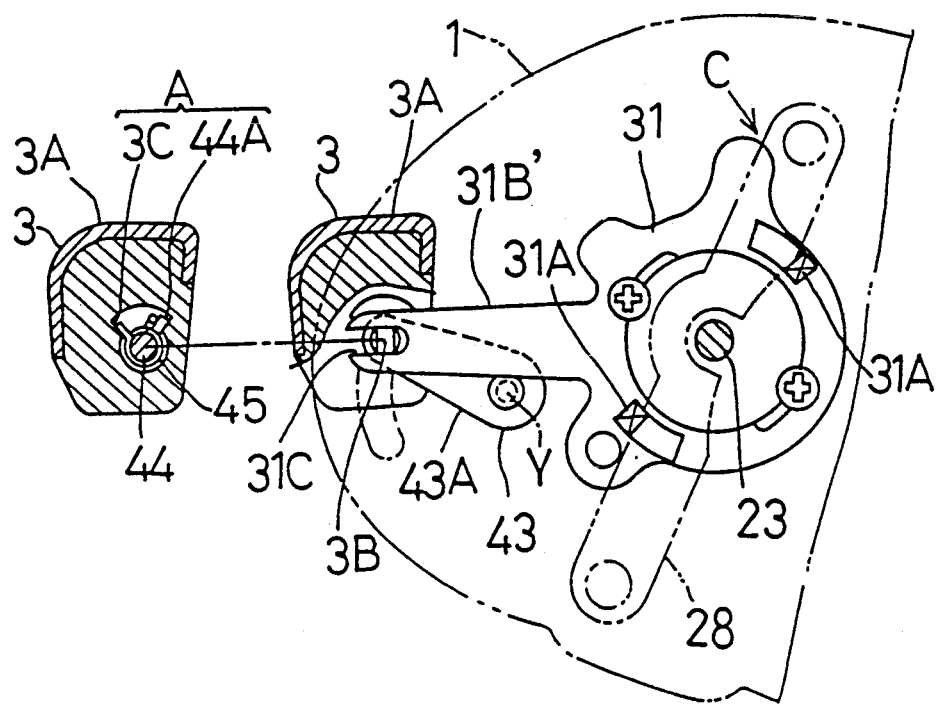
FIG. 8 is a fragmentary side view in vertical section showing a clutch controller in a clutching engaging position according to a different embodiment.
Figure 9:
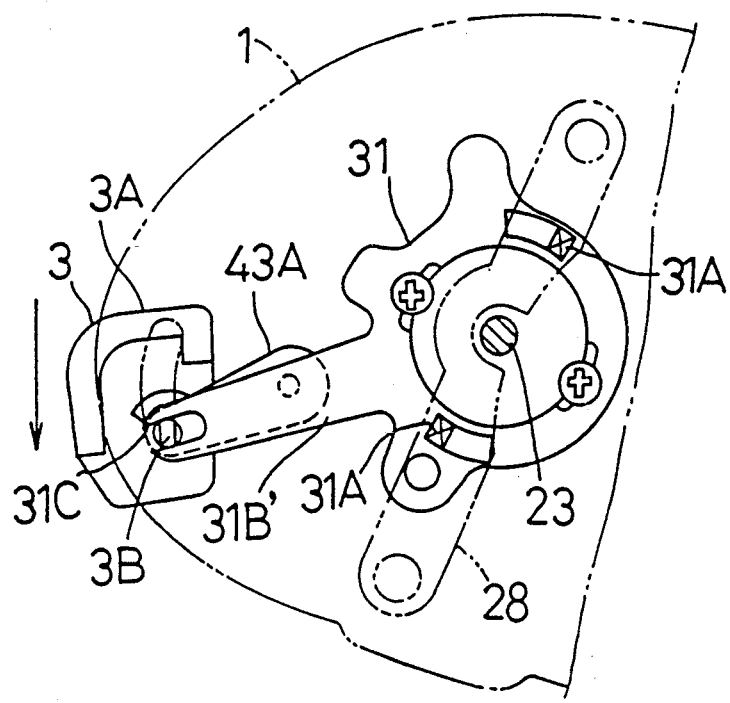
FIG. 9 is a fragmentary side view in vertical section showing the clutch controller of FIG. 8 in a declutching position.

A structure for attaching the clutch controller 3 will be described next. As shown in FIGS. 8 and 10, a rotary shaft 52 extends between the right and left side bodies 1, and supports an oscillatable element 43. The oscillatable element 43 has support arms 43A extending therefrom. A support shaft 44 extends between distal ends of the support arms 43A for supporting the clutch controller 3. Thus, the clutch controller 3 is oscillatable about an axis Y of the rotary shaft 52.

A rotation limiting mechanism E is provided for limiting rotation of the clutch controller 3 relative to the support shaft 44. The rotation limiting mechanism E includes a pin 44A projecting from the support shaft 44, and an engaging recess 3C formed in an interior space of the clutch controller 3 for engaging the pin 44A. While the pin 44A is in contact with a wall of the engaging recess 3C, the clutch controller 3 is oscillatable through a fixed range about an axis X of the support shaft 44. A pin 45 extends between the pin 44A and engaging recess 3C to act as a biasing mechanism to maintain a thumb rest surface 3A of the clutch controller 3 in a predetermined angular posture. This posture is horizontal when the clutch mechanism C is engaged. The clutch controller 3 includes a resin body, and a pressed aluminum sheet formed integral with the resin body to define the thumb rest surface 3A. This construction produces the same effect as described with reference to the cover 9.

This embodiment may be modified as follows:

(1) The pin and engaging recess of the rotation limiting mechanism A may be formed on or in the clutch controller and support shaft, respectively.

(2) The biasing mechanism may comprise a different type of spring such as a disk spring, or an elastic material such as rubber or plastics.

(3) The biasing mechanism may be adapted to maintain the thumb rest surface 3A in a neutral posture.

What is claimed is:

1. A baitcasting reel, comprising:

right and left side bodies, a spool, and a transmission line for driving said spool, said spool having an axis of rotation, said transmission line including a clutch mechanism;

a clutch controller for operating said clutch mechanism, said clutch controller being located between said side bodies and adjacent said spool, said clutch controller being manually movable between first and second control positions for engaging and disengaging said clutch mechanism, respectively, said clutch controller including a thumb rest surface; and a link mechanism for connecting said clutch controller to said side bodies, said link mechanism including first and second interlocking pins and first and second oscillatable arms, said pins being attached to said clutch controller, said first and second oscillatable arms being attached to said first and second interlocking pins, respectively, said interlocking pins being spaced apart from each other in a direction parallel to the axis of said spool, said link mechanism being arranged such that said thumb rest surface is prevented from tilting away from said spool during movement of said clutch controller from said first control position to said second control position.

2. A baitcasting reel as claimed in claim 1, further comprising a spool shaft for supporting said spool, and wherein said clutch mechanism includes an engaging pin attached to an intermediate position of said spool shaft, and a clutch sleeve slidably mounted on said spool shaft to be engageable with said engaging pin.

3. A baitcasting reel as claimed in claim 2, further comprising a pair of support shafts extending parallel to said spool shaft for sliding said clutch sleeve, a shifter supported on said support shafts, coil springs mounted on said support shafts to urge said shifter to a clutch engaging position, and an annular cam rotatably mounted coaxially with said spool shaft to operate said shifter to a declutching position.

4. A baitcasting reel as claimed in claim 3, wherein said annular cam is switchable by a first toggle spring between a first operative state to engage said clutch mechanism and a second operative state to disengage said clutch mechanism.

5. A baitcasting reel as claimed in claim 1, wherein said clutch controller has right and left side walls, and wherein said oscillatable arms have the same length and extend from said right and left side bodies to said right and left side walls of said clutch controller, respectively.

6. A baitcasting reel as claimed in claim 1, wherein said clutch controller includes right and left side walls, and wherein said oscillatable arms extend from said right and left side bodies to said right and left side walls of said clutch controller, respectively, said first oscillatable arm being longer than said second oscillatable arm.

7. A baitcasting reel, comprising:

right and left side bodies, a spool, and a transmission line for driving said spool, said spool having an axis of rotation, said transmission line including a clutch mechanism;

a clutch controller for operating said clutch mechanism, said clutch controller being located between said side bodies and adjacent said spool, said clutch controller being manually movable between first and second control positions for engaging and disengaging said clutch mechanism, respectively, said clutch controller including a thumb rest surface; and a link mechanism for connecting said clutch controller to said side bodies, said link mechanism including right and left interlocking pins and right and left oscillatable arms, said pins being attached to said clutch controller, said right and left oscillatable arms being attached to said right and left interlocking pins, respectively, and said right and left arms having the same length, said interlocking pins being spaced apart from each other in a direction parallel to the axis of said spool, said link mechanism being arranged such that said thumb rest surface is prevented from tilting away from said spool during movement of said clutch controller from said first control position to said second control position.

* * * * *